Patented Jan. 20, 1942

2,270,755

UNITED STATES PATENT OFFICE 2,270,755

SULPHONIC ACIDS OF AMIDINES

William H. Hill, Mount Lebanon, Pa., assignor to American Cyanamid Company, New York, N. Y., a corporation of Maine No Drawing. Application December 21, 1940, Serial No. 371,208

6 Claims. (Cl. 260—500)

The present invention relates to methods of preparing sulphonic acids of amidine bases which possess the characteristic guanyl grouping and substitution products thereof.

In my copending application Serial No. 305,176, filed November 18, 1939, I have disclosed methods of producing salts in the form of addition products by reacting sulphamic acid with amidine bases which possess the characteristic guanyl grouping. Such salts may be represented by the type formula:

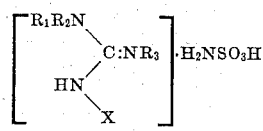

in which $R_1$, $R_2$ and $R_3$ are members of the group consisting of hydrogen, alkyl, hydroxy alkyl, aryl, aralkyl and heterocyclic radicals, and X is a member of the group consisting of

and

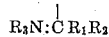

The substituents $R_1$, $R_2$ and $R_3$ may be the same or different in the various bases included within the scope of the invention of Serial No. 305,176 and it should be understood that each symbol is intended to represent any member of its defined group.

An inspection of the above type formula will show that my invention includes the sulphamic acid salts of the amidine bases contained within the group consisting of guanidine, guanyl urea, guanyl guanidine and their basic reaction substitution products, which salts may be used as intermediates in the preparation of the corresponding amidine salts.

Any guanidine base of the above group may be used for the purpose, such as guanidine itself, dimethyl or trimethyl guanidine, dibutyl guanidine, mono-, di- or triphenyl guanidine, ditolyl guanidine, or hydroxyalkyl substituted guanidines such as mono-, di- or triethanol guanidine and the like. Similarly such guanyl urea compounds, as guanyl urea itself, mono- or di-methyl guanyl urea, diphenyl guanyl urea, tetra-ethyl guanyl urea, and triethanol guanyl urea are organic bases which will form salts of sulphamic acid.

The salts may be prepared by simply mixing a solution containing the free amidine base or its carbonate with a solution of sulphamic acid. One may also start with the amidine sulphate or other mineral acid salt, from which the free base can be liberated by dissolving the salt in alcohol, adding an alkali such as sodium hydroxide thereto and removing the precipitated sodium sulphate, or other salts.

It has now been discovered that if any of the above sulphamates are subjected to protracted heating at temperatures from 140 to 300° C., the ammonium salt of the corresponding sulphonic acid is transitorially produced which, upon further heating within the above range, is converted to the corresponding sulphonic acid with liberation of ammonia.

Example I

When guanyl urea sulphamate is heated to approximately 160° C., a melt is obtained which becomes foamy and ammonia escapes. After the reaction had subsided, the product was found to contain substantial quantities of guanyl urea sulphonic acid containing some proportion of the ammonia salt thereof. Continued heating until no more ammonia is evolved converts any of the residual ammonium salt into the guanyl urea sulphonic acid.

Example II

Guanidine sulphonic acid was obtained by heating guanidine sulphamate in an oil bath to 180° C. The glass-clear, very light brown melt at that temperature started to evolve ammonia and the reaction seemingly being exothermic, quickly drove the temperature up to 205° C. The temperature, on continued heating, slowly rose to 225° C., and was eventually carried to 270° C. with continued evolution of ammonia, the color becoming lighter. The melt remained glass-clear. A portion of the cooled melt, upon being dissolved in water, showed a pH of approximately 4. Upon the addition of barium hydroxide to the solution, a fleeting white precipitate was formed which, upon agitation, redissolved showing conclusively the absence of sulphates.

Example III 228 g. of ammonium sulphamate and 84 g. of dicyandiamide were reacted on an oil bath having a temperature of 155° C. Ammonia was evolved continuously in small amounts and at 115° C. a thin melt had formed which thickened appreciably at 125° C. At 150° C. a clear thin melt was obtained and an exothermic reaction set in increasing the temperature of the reaction mass to 175 C. even though the oil bath was only 155° C. The reaction mixture was removed and allowed to cool to 150° C. whereupon heating on the oil bath was resumed. A total heating time of 3 hours, ½ an hour of which was necessary to heat the mixture to 150° C., was used. During this heating period the temperature was maintained for the most part between 145 and 155° C. This product, guanidine sulphamate, when heated continuously at 225° C. or higher, evolves ammonia and changes its color, yielding a light colored product, soluble in water and containing a considerable proportion of guanidine sulphonic acid.

Various and substituted guanidine sulphonic acids may be prepared from the corresponding substituted ammonium sulphamates.

Similarly by heating other sulphamates of amidines possessing the characteristic guanyl grouping, the corresponding sulphonic acid compound thereof will be produced.

In some cases, it will be found desirable, instead of protracted heating in order to convert residual amounts of the ammonium salt of the sulphonic acid to the latter, to dissolve the crude melt formed after the initial reaction in water and generate the acid by adding thereto a mineral acid, such as sulphuric.

While the invention has been described with particular reference to specific embodiments, it is to be understood that it is not to be limited thereto but is to be construed broadly, and restricted solely by the scope of the appended claims.

I claim:

1. The method which comprises heating a substance chosen from the group consisting of guanidine sulphamate, substituted guanidine sulphamates, guanyl urea sulphamate and substituted guanyl urea sulphamates to a temperature sufficient to evolve ammonia and recovering the corresponding sulphonic acid.

2. The method which comprises heating a substance chosen from the group consisting of guanidine, sulphamate, substituted guanidine sulphamates, guanyl urea sulphamate and substituted guanyl urea sulphamates to a temperature of from 140 to 300° C. to evolve ammonia and converting the thus formed ammonium salt of the corresponding sulphonic acid to the free acid.

3. The method of claim 1 with the additional step of cooling the reaction product, dissolving the same in water, and adding a mineral acid thereto to convert the ammonium salt of the corresponding sulphonic acid to the free sulphonic acid.

4. The method of claim 1 with the additional step of cooling the reaction product, dissolving the same in water, and adding sulphuric acid thereto to convert the ammonium salt of the corresponding sulphonic acid to the free sulphonic acid.

5. The method of preparing guanyl urea sulphonic acid which comprises heating guanyl urea sulphamate until ammonia is evolved and recovering guanyl urea sulphonic acid from the resultant product.

6. The method of preparing guanidine sulphonic acid which comprises heating guanidine sulphamate until ammonia is evolved, cooling the melt and dissolving the same in water, adding sulphuric acid thereto and recovering the guanidine sulphonic acid therefrom.

WILLIAM H. HILL.